United States Patent [19]

Lee et al.

[11] Patent Number: 4,969,813

[45] Date of Patent: Nov. 13, 1990

[54] MOLDING APPARATUS FOR FABRICATING A PLASTIC CONTAINER

[75] Inventors: Norman C. Lee, Greensboro; Thomas E. Douglas, Reidsville, both of N.C.

[73] Assignee: Zarn, Inc., Reidsville, N.C.

[21] Appl. No.: 418,947

[22] Filed: Oct. 6, 1989

Related U.S. Application Data

[63] Continuation of Ser. No. 927,334, Nov. 5, 1986, abandoned.

[51] Int. Cl.$^5$ .............................................. B29C 49/20
[52] U.S. Cl. .................................. 425/503; 220/85 D; 220/94 R; 220/908; 264/516; 264/531; 425/522; 425/525; 206/519
[58] Field of Search ...................... 425/503, 525, 522; 264/516, 531, 536; 220/1 T, 85 D, 94 R, 94 A

[56] References Cited

U.S. PATENT DOCUMENTS

| | | | |
|---|---|---|---|
| 3,140,329 | 7/1964 | Nutting | 264/516 X |
| 3,579,620 | 5/1971 | Pettersson | 425/525 X |
| 3,585,681 | 6/1971 | Branscum et al. | 425/525 X |
| 3,742,995 | 7/1973 | Confer et al. | 425/525 X |
| 4,170,623 | 10/1979 | Du Bois et al. | 264/534 |
| 4,199,129 | 4/1980 | Fischer | 425/525 X |
| 4,207,284 | 6/1980 | Speas | 264/516 |
| 4,215,089 | 7/1980 | Uhlig et al. | 264/516 |
| 4,280,630 | 7/1981 | Hafele | 264/532 X |
| 4,298,567 | 11/1981 | Aoki | 264/516 |
| 4,307,059 | 12/1981 | Cambio | 264/516 |
| 4,439,393 | 3/1984 | Saito et al. | 425/525 X |
| 4,479,751 | 10/1984 | Wyman et al. | 414/406 |

OTHER PUBLICATIONS

"Roll-A-Waste Systems by Zarn Inc.", Booklet Published by Zarn, Inc., Reidsville, N.C.
"We Enjoy What We Do At . . . Zarn, Inc.", Advertising Brochure Published by Zarn, Inc., Reidsville, N.C.
"Only Perkins Swings You Into Profitable Wheel Cart Dumpting", Advertisement Published by Perkins Mfg. Co., LaGrange, Ill.
"Roll-A-Waste Systems by Zarn, Inc." Booklet Published by Zarn, Inc., Reidsville, N.C.
"We Enjoy What We Do At . . . Zarn, Inc." Advertisement Pamphlet Published by Zarn, Inc., Reidsville, N.C.
"Only Perkins Swings You Into Profitable Wheel Cart Dumpting" Advertisement Pub. By Perkins Mfg. Co., LaGrange, Ill.

Primary Examiner—Richard L. Chiesa
Attorney, Agent, or Firm—Shefte, Pinckney & Sawyer

[57] ABSTRACT

A nestable plastic trash container having integrally bonded upper and lower plastic lifter bar members for automated dumping operation by conventional semi-automatic dumping apparatus is fabricated by initially preforming the lifter bar members by blow molding, inserting the preformed lifter bar members into respective recesses in another blow mold apparatus for forming the main body of the container, and then blow molding the main container body while simultaneously bonding it to the preformed lifter bar members. The insert-receiving recesses of the container body blow mold apparatus and the preformed lifter bar members respectively have compatible end-to-end convex arcuate surfaces which abut in sealing relation during the blow molding of the container body to prevent escape of the plastic material into the insert-receiving recesses. The bonding surfaces of the preformed insert bar members are similarly convexly arcuate to direct the plastic material of the container body to expand uniformly about the bonding surfaces for bonding thereto of a generally consistent wall thickness of the main container body.

15 Claims, 14 Drawing Sheets

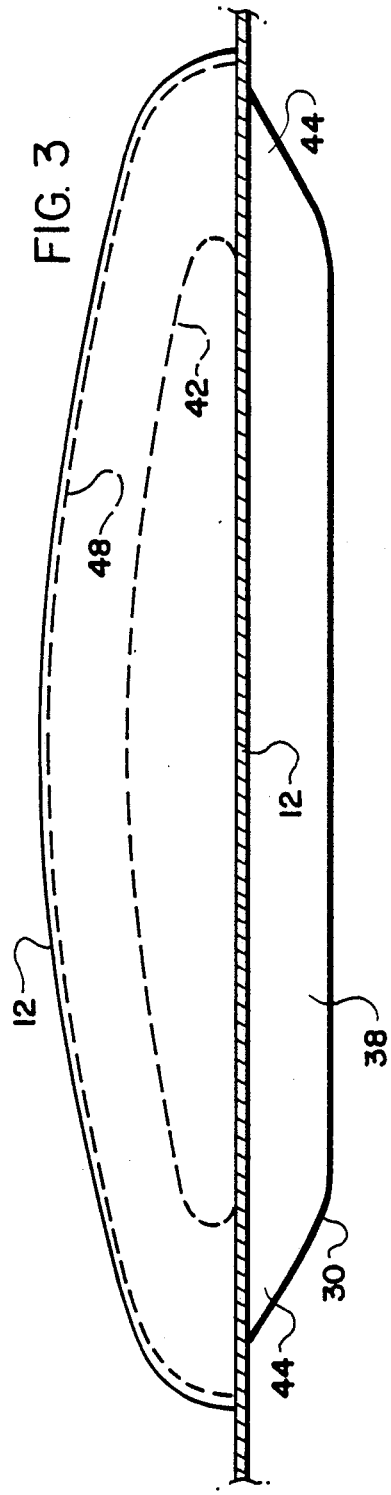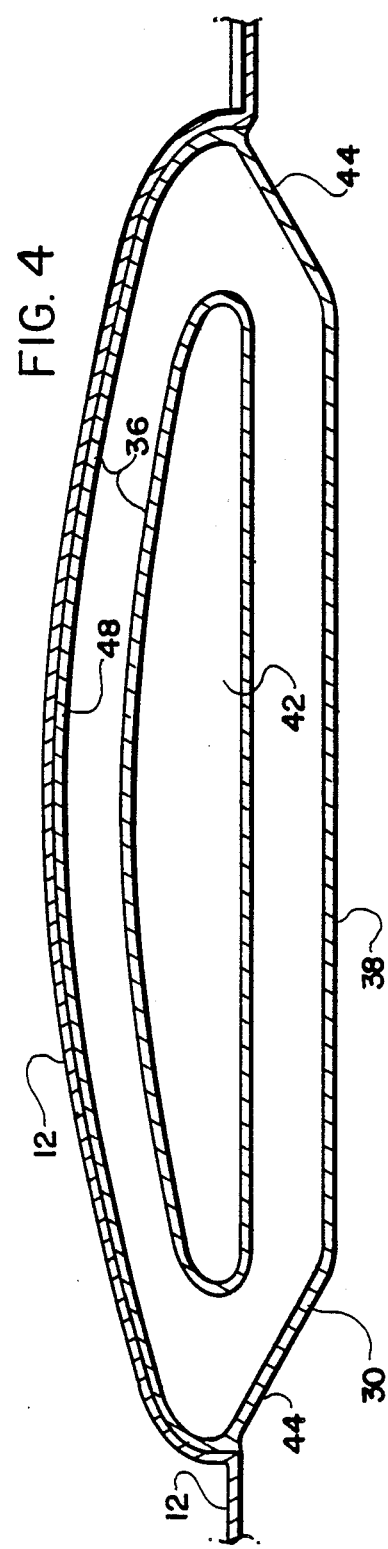

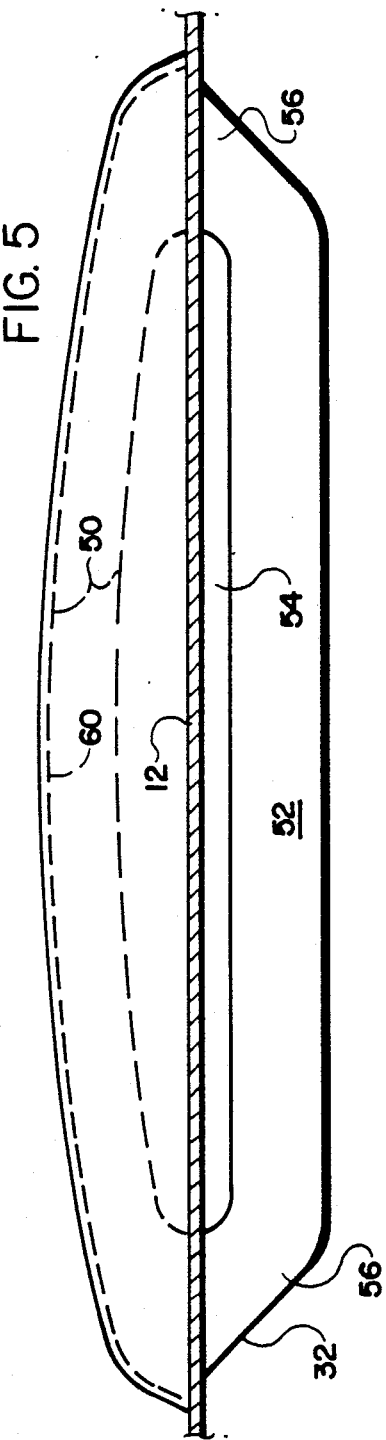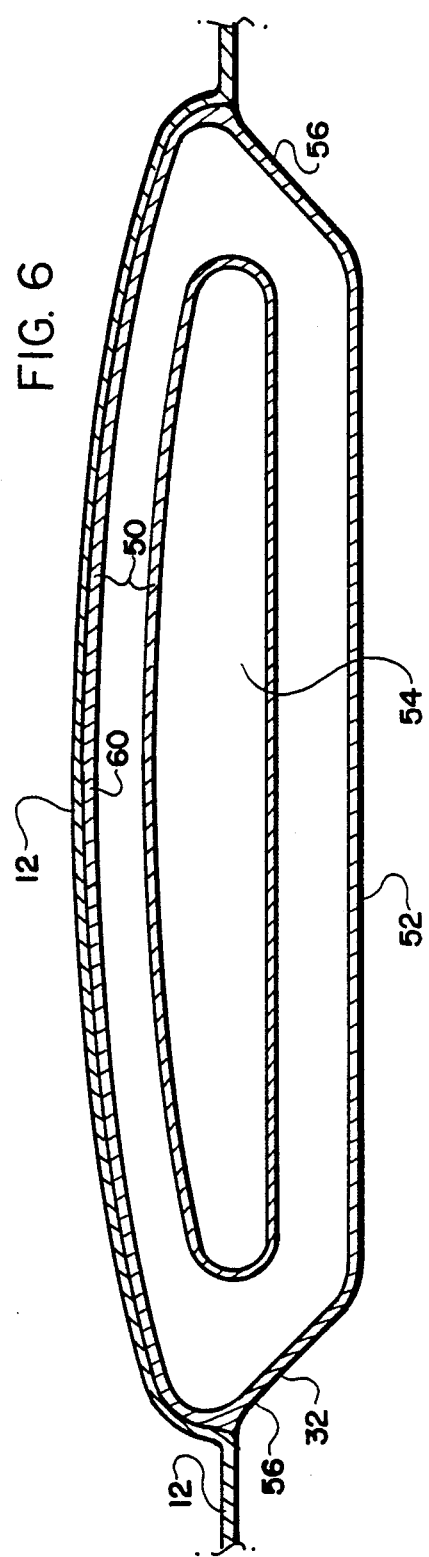

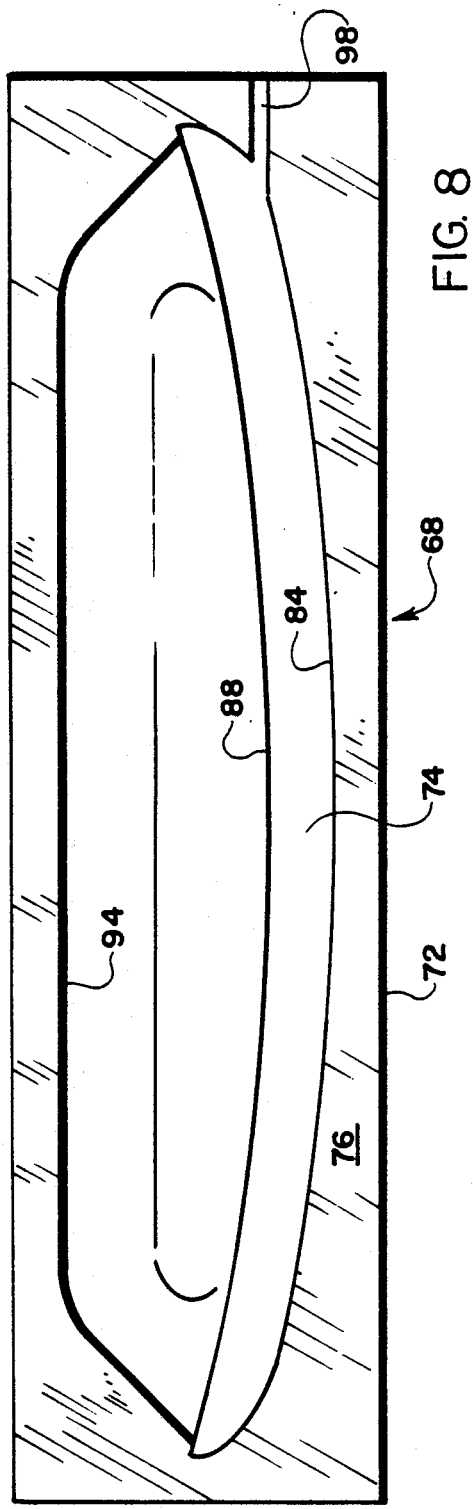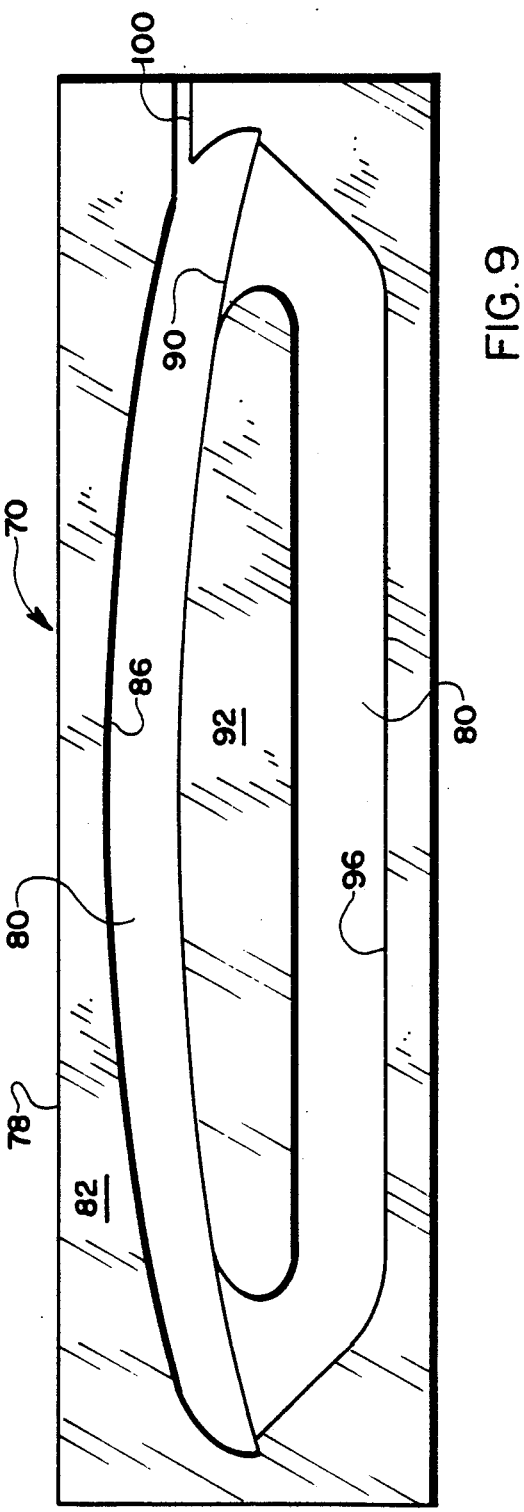

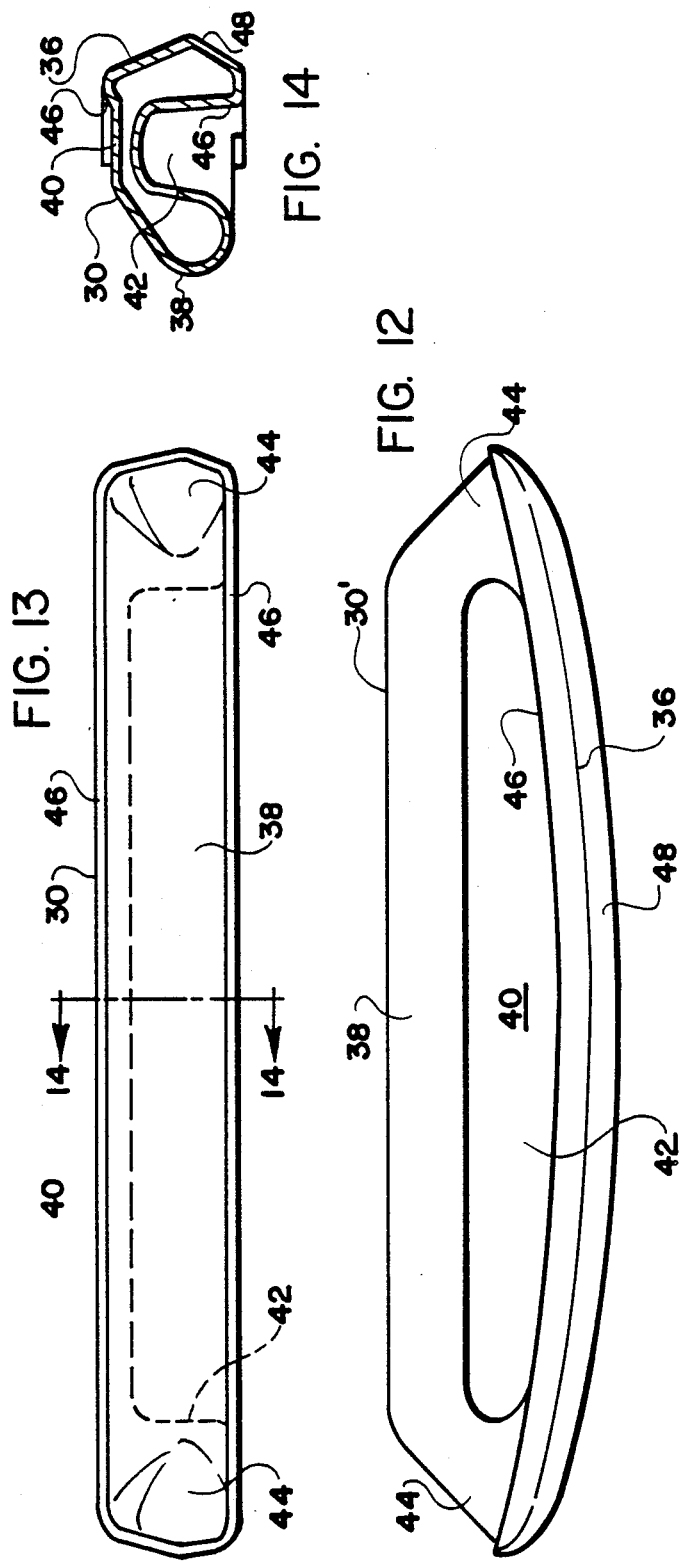

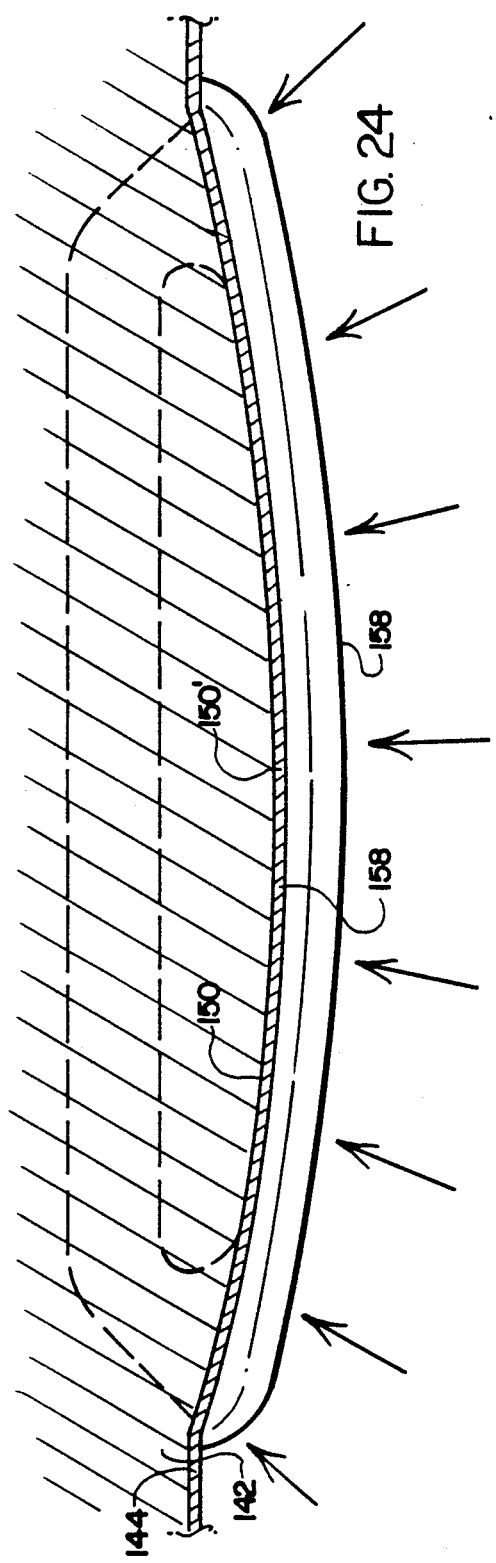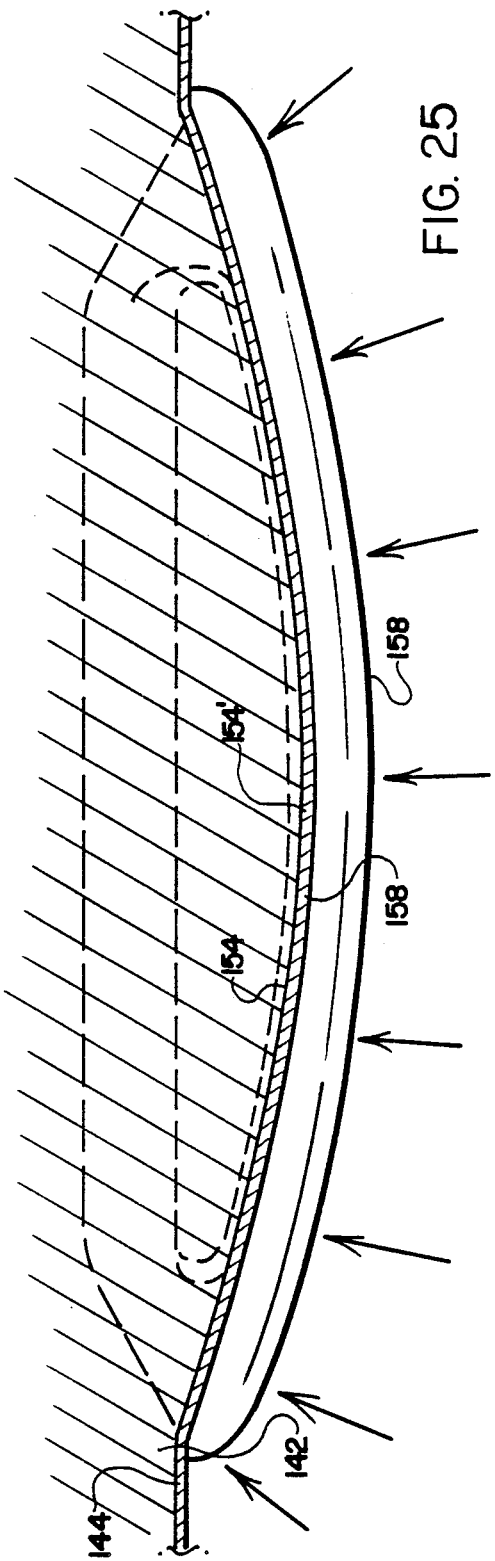

MOLDING APPARATUS FOR FABRICATING A PLASTIC CONTAINER

CROSS-REFERENCE TO RELATED APPLICATIONS

This is a continuation of co-pending U.S. patent application Ser. No. 927,334, filed Nov. 5, 1986, for "PLASTIC CONTAINER AND METHOD OF FABRICATING SAME," now abandoned.

BACKGROUND OF THE INVENTION

The present invention relates generally to containers formed of thermoplastic material and methods of fabricating such containers. More particularly, the present invention relates to plastic trash containers of the type adapted for mechanized emptying by an automated dumping apparatus of the semi-automatic type and to methods of blow molding such containers.

In recent years, municipalities as well as private firms have increasingly begun to implement and utilize automated trash collection systems for curb side trash collection to obtain the advantages of increased trash collection speed, a corresponding reduction in required equipment and personnel, and an attendant reduction in required manual handling of trash containers, all of which ultimately result in significant savings in the overall costs of operation of a trash collection system. Basically, most automated trash collection systems involve the use of an automated dumping apparatus mounted on a collection vehicle for mechanized lifting and inversion of compatible trash containers to empty their contents into the collection vehicle. In so-called semi-automatic trash collection systems, special trash containers are utilized each having an upper and lower lifter bar by which the container may be mounted by collection personnel onto a compatible automated dumping apparatus on the collection vehicle for mechanized inversion of the trash container by its lifter bars to empty its contents into the collection vehicle. Representative examples of trash containers of this semi-automatic type are the various models of ROLL-A-WASTE® plastic containers manufactured and sold by Zarn, Inc., of Reidsville, N.C., the assignee hereof. Representative examples of compatible semi-automatic dumping apparatus are the TUCK-AWAY® brand dumping unit manufactured and sold by Perkins Manufacturing Company, of Le Grange, Ill. and the dumping apparatus disclosed in Wyman et al U.S. Pat. No. 4,479,751.

Conventionally, the main container body of such semi-automatic trash containers is fabricated of a plastic material such as high density polyethylene which provides suitable strength, durability and corrosion resistance for long-term usage. Of the various conventional methods by which such plastic containers can be fabricated, blow molding is considered advantageous over thermoforming and rotational molding techniques in providing superior stress and crack resistance, impact strength and useful life. On the other hand, the lifter bar components of conventional semi-automatic trash containers are typically formed of tubular metal and bolted to the exterior of the main container body, which is conventionally thought to be necessary, or to be at least the most economical manner, to achieve the three-fold criteria of properly configuring the lifter bars to be compatible with conventional semi-automatic dumping apparatus, providing sufficient strength of joinder of the lifter bars to the container body to withstand the forces typically exerted on the trash containers by such dumping apparatus, and also enabling the container bodies to be shipped in a nested fashion with other like containers. Disadvantageously, however, such metal lifter bars require special treating of the metal surfaces to provide suitable corrosion resistance and further require a separate assembly step in bolting the bars to the container body, all of which adds to the overall cost of the container. It would be significantly more desirable to utilize lifter bars fabricated of the same plastic material as the main container body and to bond the lifter bars to the container body as part of the molding process, if the above-mentioned three-fold criteria of dumpercompatible lifter bar configuration, secure lifter bar affixation to the container body, and nestability of the containers could be reasonably achieved economically.

SUMMARY OF THE INVENTION

It is accordingly an object of the present invention to provide an improved plastic container having one or more plastic lifter bar members and a method of fabricating such a container utilizing blow molding techniques, which improved container and fabrication method can be adapted to the structure and fabrication of a semi-automatic trash collection container.

Briefly summarized, the container fabrication method of the present invention includes the provision of a blow mold apparatus having a molding cavity for forming a main body of the plastic container with a recessed insert area opening into the molding cavity and an insert land surface facing inwardly of the molding cavity continuously about the recessed area, the insert land surface being of a generally smooth end-to-end curvature convexly with respect to the molding cavity. According to the present method, the plastic lifter bar member is preformed of a configuration for insertion into the recessed insert area of the blow mold apparatus, the lifter bar member having a continuous ledge surface of a generally smooth end-to-end curvature at least generally conforming with the insert land surface and also having a continuous bonding surface defined by and facing oppositely from the ledge surface and being of a generally smooth end-to-end curvature generally corresponding to the ledge surface. The preformed lifter bar member is inserted into the recessed insert area of the blow mold apparatus with the ledge surface at least generally in facing abutment with the insert land surface and with the bonding surface protruding inwardly into the molding cavity. A plastic parison is blow molded into the molding cavity of the blow mold apparatus into conformity therewith and with the bonding surface of the lifter bar member to form a main body of the plastic container and to integrally bond the lifter bar member with the main body. During this blow molding step, the curved ledge surface conforms in essentially sealing abutting relation to land surface under the pressure of the blow molding to prevent the parison from entering the recessed area. The curved bonding surface at the same time urges the parison to expand uniformly thereabout for bonding of a generally consistent wall thickness of the parison to the bonding surface.

In the preferred embodiment, this basic method is utilized for fabricating a plastic trash container of the type adapted for mechanized emptying by an automated dumping apparatus of semi-automatic type. For this purpose, the blow mold apparatus is provided with spaced upper and lower recessed insert areas each having a respective annular insert land surface of a generally uniform end-to-end arcuate curvature. Both an upper lifter bar member and a lower lifter bar member are preformed, preferably by blow molding a plastic lifter bar parison in each case, with each lifter bar member having a lifter bar body which includes a continuous annular ledge surface of generally uniform end-to-end arcuate curvature at least generally conforming with the insert land surface and having a continuous bonding surface of generally end-to-end arcuate curvature essentially concentric with the ledge surface. Preliminary to the blow molding of the main container body, the upper and lower lifter bar members are respectively inserted into the upper and lower recessed insert areas of the blow mold apparatus for integral bonding of the lifter bar members with the main container body during the blow molding of the plastic container parison.

Preferably, in the preforming of the upper lifter bar member, its respective lifter bar parison is pinched during the blow molding thereof to form an undercut on the upper lifter bar member at the outward side thereof opposite its bonding surface to configure the upper lifter bar member for engagement by a compatible semi-automatic dumping apparatus. During the blow molding preformation of the lower lifter bar member, its plastic parison is also pinched in a central area thereof to form a bonding portion having the ledge and bonding surfaces and an outward lifting engagement portion spaced by an open clearance area from the bonding portion. It is also preferred that the molding cavity of the blow mold apparatus be formed of a suitable configuration to permit the nesting of the trash container with other like containers.

The resultant preferred plastic trash container thus includes a hollow plastic main body with upper and lower plastic lifter bar members bonded in spaced relation exteriorly to the main container body and configured for engagement by a compatible semi-automatic dumping apparatus. Each lifter bar member has a lifter bar body having a continuous bonding surface of a generally uniform end-to-end curvature integrally bonded to the exterior of the main container body in substantially continuous surface contact therewith and deforming the main container body inwardly of its hollow interior. The upper lifter bar member includes an undercut at the outward side thereof opposite its bonding surface and the lower lifter bar member has an outward lifting engagement portion spaced by an open clearance area from its bonding surface. Preferably, the main body of the plastic trash container is configured to nest with other like containers.

BRIEF DESCRIPTION OF THE DRAWINGS

FIG. 3 is a horizontal cross-sectional view of the trash container of FIGS. 1 and 2 taken along line 3—3 of FIG. 2;

FIG. 4 is another horizontal cross-sectional view of the plastic trash container of FIGS. 1 and 2 taken along line 4—4 of FIG. 2;

FIG. 5 is another horizontal cross-sectional view of the plastic trash container of FIGS. 1 and 2 taken along line 5—5 of FIG. 2;

FIG. 6 is another horizontal cross-sectional view of the plastic trash container of FIGS. 1 and 2 taken along line 6—6 of FIG. 2;

FIGS. 8 and 9 are schematic plan views of the respective mold halves of a blow mold apparatus for the blow molding of the upper lifter bar member of the plastic trash container of FIGS. 1 and 2;

FIG. 12 is a bottom plan view of the upper lifter bar member of the plastic trash container of FIGS. 1 and 2;

FIG. 13 is a front elevational view of the upper lifter bar member;

FIG. 14 is a vertical cross-sectional view of the upper lifter bar member taken along line 14—14 of FIG. 13;

FIG. 24 is a horizontal cross-sectional view of the blow mold apparatus of FIG. 23 taken along line 24—24 thereof; and FIG. 25 is another horizontal cross-sectional view of the blow mold apparatus of FIG. 23 taken along line 25—25 thereof.

DETAILED DESCRIPTION OF THE PREFERRED EMBODIMENT

Figure 1:
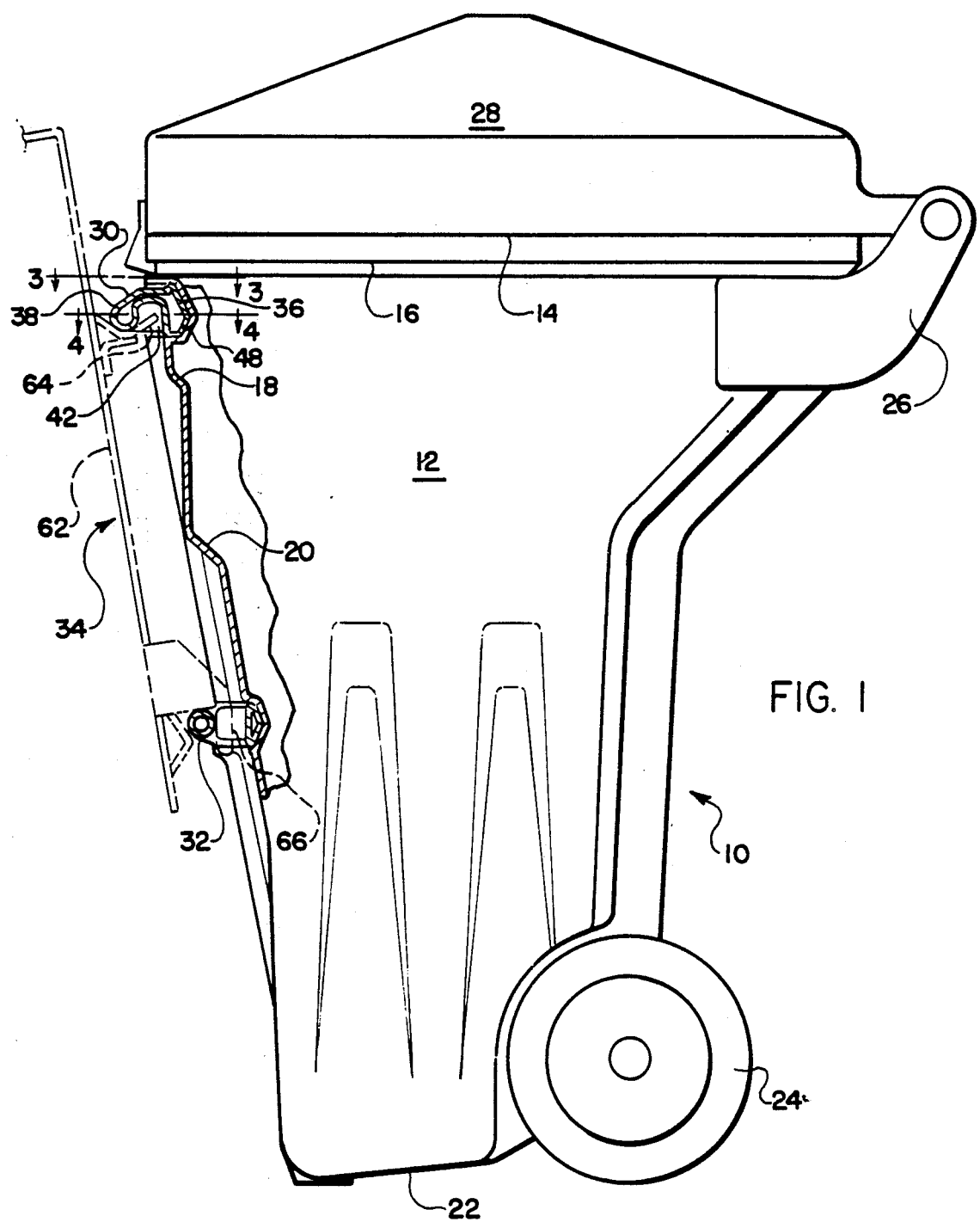
FIG. 1 is a side elevational view, partially in vertical cross-section, of a plastic trash container according to the preferred embodiment of the present invention, with a conventional compatible semi-automatic dumping apparatus shown in phantom lines in engagement with the lifter bar members of the container.
Figure 2:
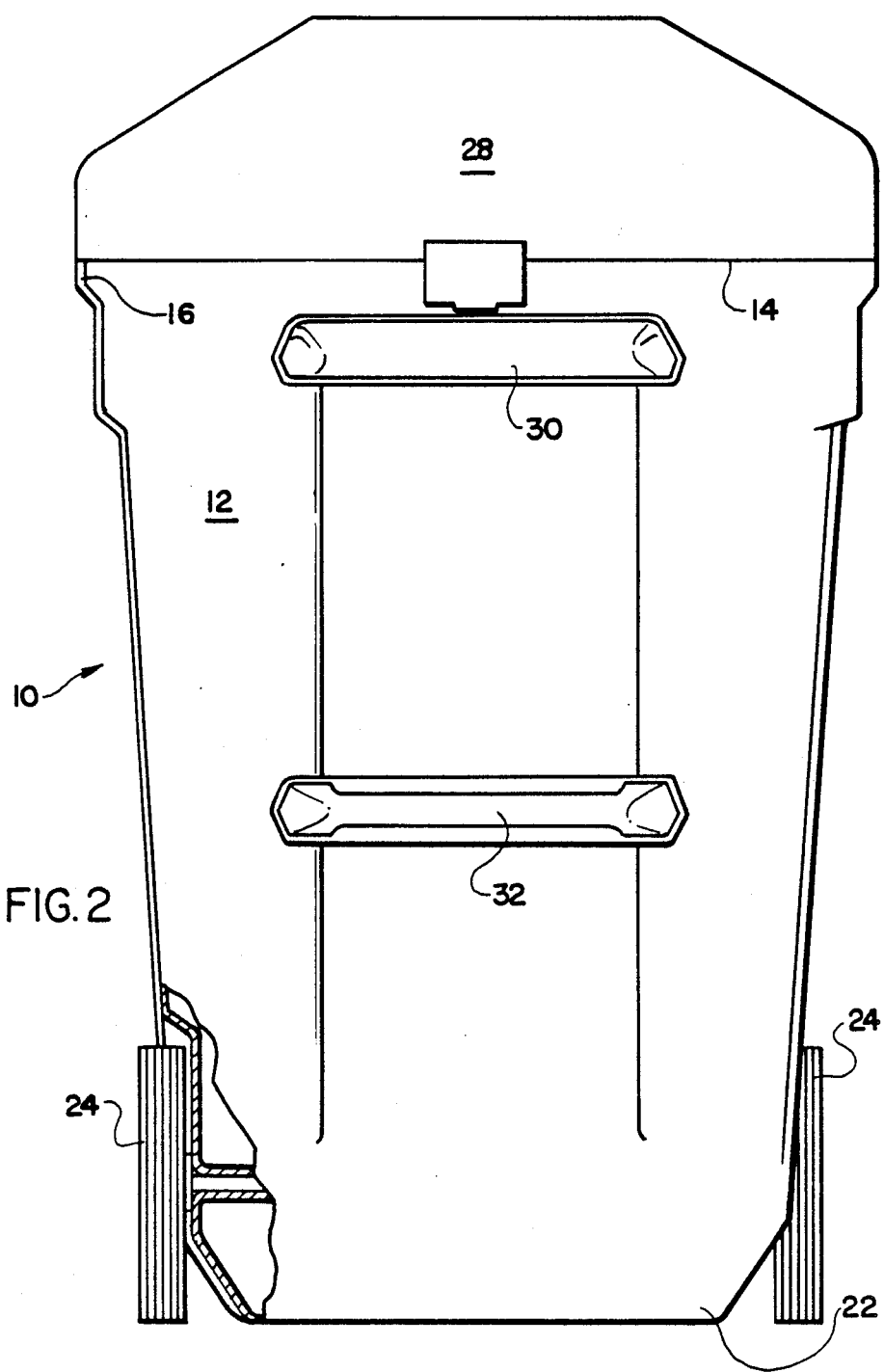
FIG. 2 is a front elevational view of the plastic trash container of FIG. 1.

Referring now to the accompanying drawings and initially to FIGS. 1 and 2, a plastic trash container according to the preferred embodiment of the present invention is indicated generally at 10. The trash container 10 includes a hollow plastic main body 12 having an open top 14 defined by a rim portion 16, the body 12 tapering inwardly through a series of several undercut portions, such as indicated at 18 and 20, to a closed bottom defined by bottom wall 22. A pair of wheels 24 are rotatably mounted to opposite sides of the lower end of the main body 12 adjacent the rear thereof and a plastic handle assembly 26 is affixed to opposite sides of the upper end of the main body 12 immediately beneath the rim 16 to extend across the rear of the main body 12, thus permitting easy manual maneuvering of the container 10. A plastic lid 28 is pivotably affixed to the handle assembly 26 for movement into and out of snug engagement about the rim 16 of the main body 12 to permit opening and closing of its open top 14.

Figure 21:
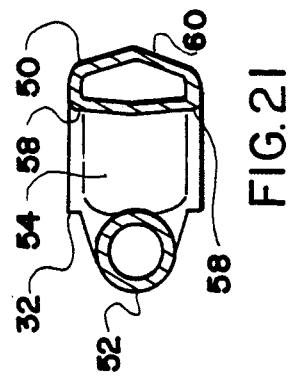
FIG. 21 is a vertical cross-sectional view of the lower lifter bar member taken along line 21—21 of FIG. 20.
Figure 20:
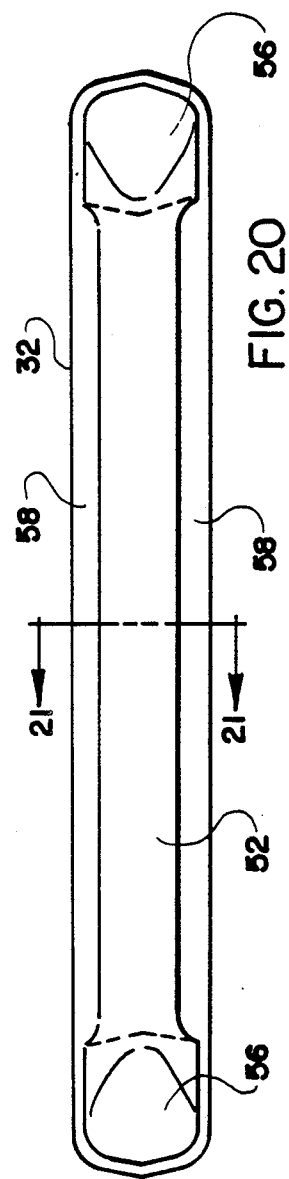
FIG. 20 is a front elevational view of the lower lifter bar member.
Figure 19:
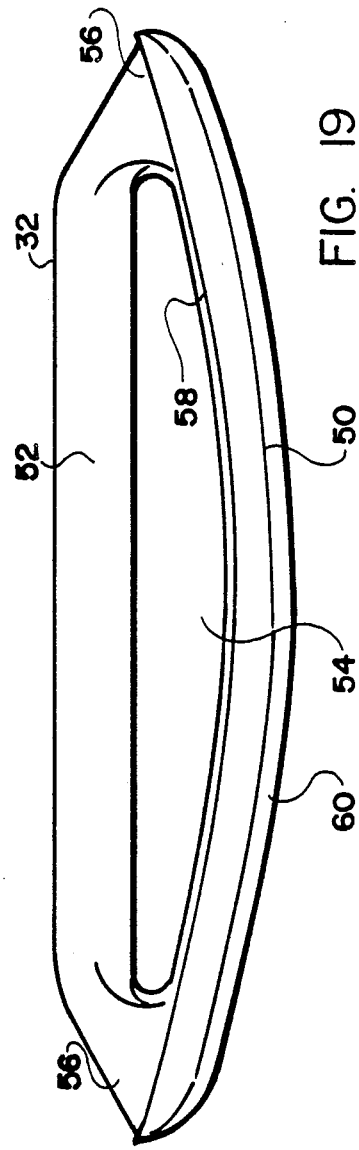
FIG. 19 is a plan view of the lower lifter bar member of the plastic trash container of FIGS. 1 and 2.
Figure 22:
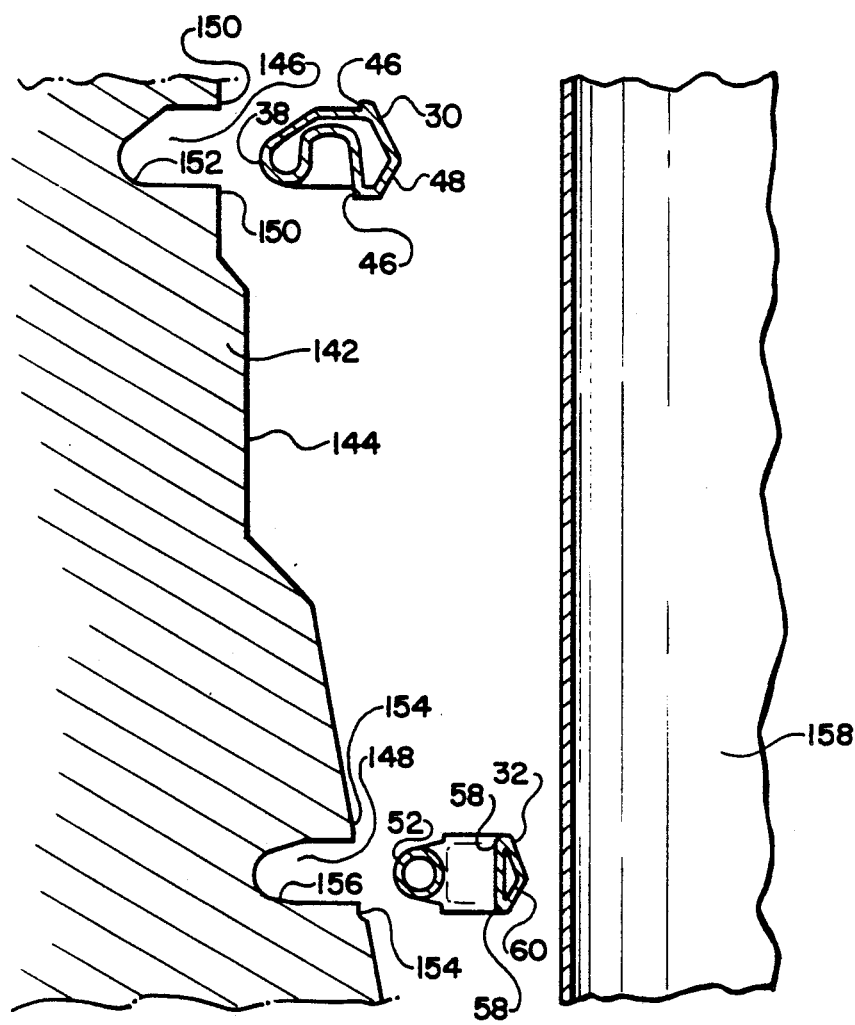
FIG. 22 is a schematic exploded vertical cross-sectional view of a blow mold apparatus for forming the plastic trash container of FIGS. 1 and 2, illustrated preliminary to the insertion of the upper and lower lifter bar members into the blow mold apparatus and the blow molding of a plastic parison to form the plastic trash container.
Figure 23:
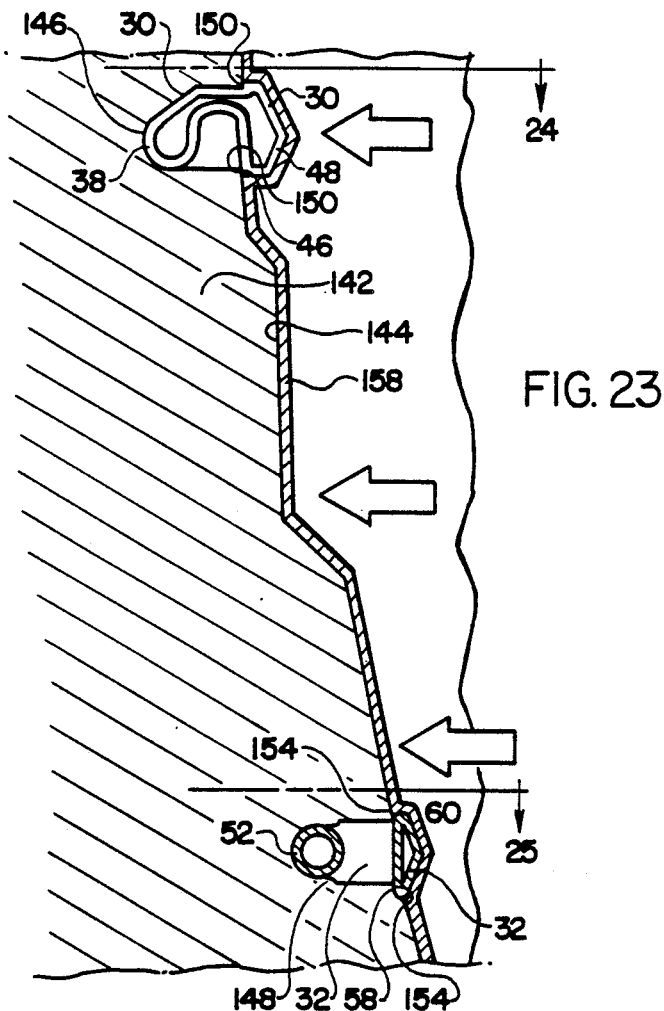
FIG. 23 is a vertical cross-sectional of the blow mold apparatus of FIG. 22, showing the completion of the blow molding of the plastic parison to form the plastic trash container.

An upper plastic lifter bar member 30 is bonded to the front side of the main body 12 in a horizontal disposition extending thereacross immediately beneath the rim 16 and, similarly, a lower plastic lifter bar member 32 is bonded to the front side of the main body 12 in a substantially parallel horizontal disposition at a downward and inward spacing from the upper lifter bar member 30, to be adapted for compatible engagement by substantially any conventional automated dumping apparatus of the semi-automatic type, representatively indicated at 34. As seen in FIGS. 12-14, the upper lifter bar 30 is of a tubular plastic construction having a bonding portion 36 and a lifter portion 38 joined along their respective upper sides by a connecting portion 40 forming an undercut area 42 intermediate the bonding and lifter portions 36,38, with the respective bonding, lifter and connecting portions 36,38,40 merging at the opposite longitudinal ends of the upper bar member 30 to form substantially closed end portions 44. The bonding portion 36 of the upper bar member 30 includes a continuous ledge surface 46 extending end-to-end and annularly about the upper lifter bar member 30 at the juncture between the bonding and connecting portions 36,40 in essentially perpendicular relation to the connecting portion 40 and a continuous bonding surface 48 defined by and facing oppositely from the ledge surface 46. The ledge and bonding surfaces 46,48 are respectively of substantially uniform end-to-end convex arcuate curvatures substantially concentric with one another, with the bonding surface 48 also being of a generally convex shape top-to-bottom. The lifter portion 38 is of a substantially rounded cross-sectional shape. Similarly, as seen in FIGS. 19-21, the lower lifter bar member 32 is also of a tubular plastic construction having a bonding portion 50 and a lifter portion 52 extending longitudinally of the lower lifter bar member 32 in spaced relation to one another separated by an intermediate clearance area 54, with the bonding and lifter portions 50,52 merging with one another at the opposite ends of the lower lifter bar member 32 to form substantially closed end portions 56. The bonding portion 50 of the lower lifter bar member 32 includes a continuous ledge surface 58 extending end-to-end and annularly about the lower lifter bar member 32 and a continuous bonding surface 60 defined by and facing oppositely from the ledge surface 58. The ledge and bonding surface 58,60 are respectively of substantially uniform end-to-end convex arcuate curvature substantially concentric with one another, with the bonding surface 60 also being of a generally convex shape top-to-bottom. The lifter portion 52 is of a substantially circular cross-sectional shape. In the finished trash container 10, the areas of the main container body 12 at which the upper and lower lifter bar members 30,32 are affixed are deformed inwardly of the hollow interior of the main body 12 in substantially the same respective shapes as the bonding surfaces 48,60 of the upper and lower lifter bar members 30,32 with the lifter bar members 30,32 being integrally bonding molecularly by their respective bonding surfaces 48,60 in substantially continuous surface contact with the exterior of the main container body 12 in such areas, as best seen in FIG. 1.

Thus, it will be understood that the upper and lower lifter bar members 30,32 adapt the trash container 10 to be compatible with semi-automatic dumping apparatus for mechanized emptying operations. Conventional semi-automatic dumping apparatus, such as the apparatus 34, characteristically include a hydraulically-operated or otherwise movable lifting carriage assembly 62 having spaced upper and lower engaging hooks 64,66 which respectively face upwardly and downwardly away from one another. Accordingly, as will be understood, the described configuration of the upper lifter bar 30 is well adapted to be engaged by the upper lifter hook 64 with the hook 64 positioned within the undercut area 42 of the upper lifter bar member 30 to position its lifter portion 38 within the hook 64. Similarly, the lower lifter bar member 32 is well configured to be engaged by the lower hook 66 by extension of the hook 66 through the clearance area 54 of the lower lifter bar member 32 to position its lifter portion 52 within the hook 66. The operation of such semi-automatic dumping apparatus once so engaged with a compatible trash container is well-known and need not be described herein.

Figure 7:
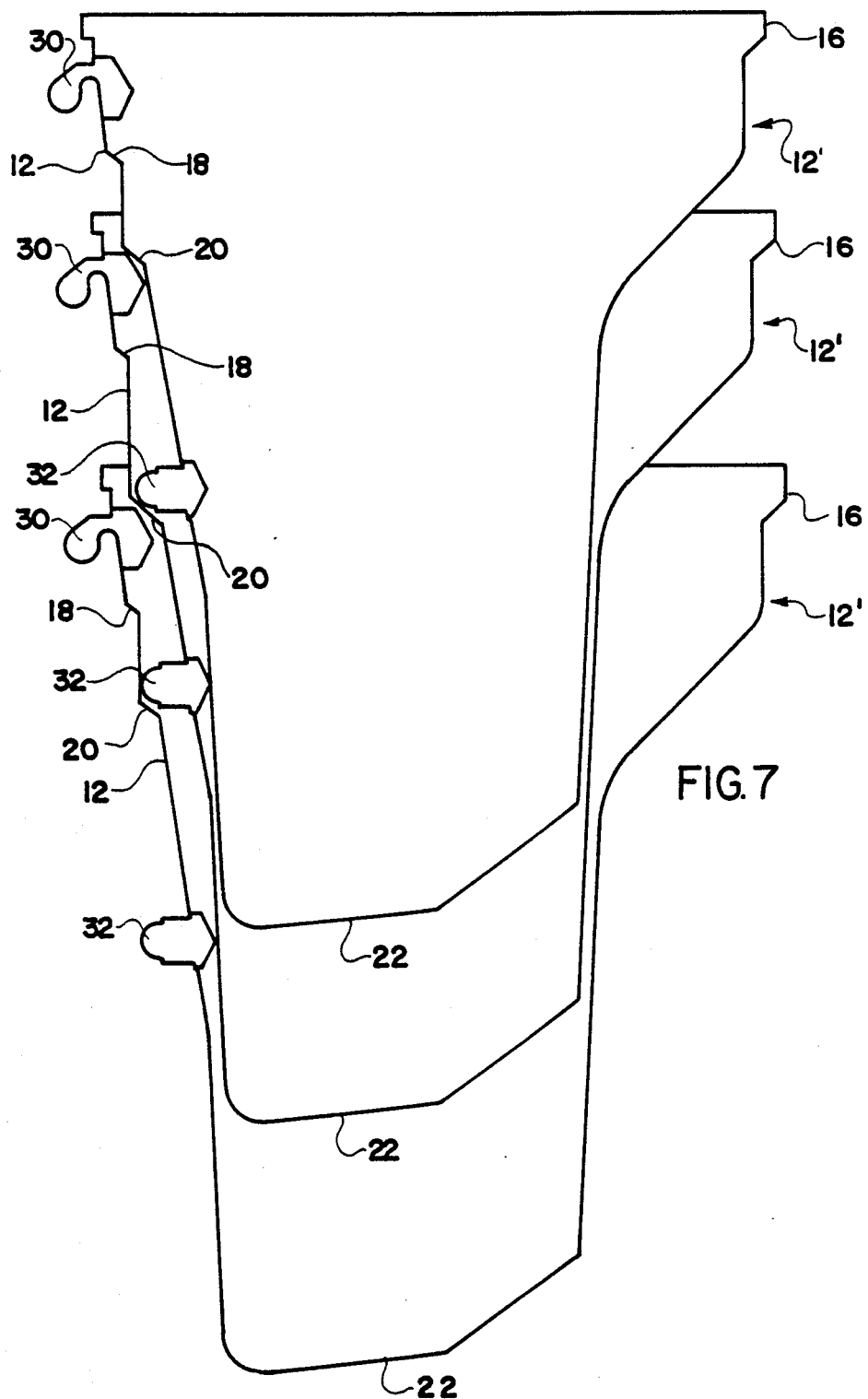
FIG. 7 is a vertical cross-sectional view illustrating several of the plastic trash containers of FIGS. 1 and 2 in nested relation with one another.

Referring now to FIG. 7, the described construction of the trash container 10 will be further understood to readily facilitate the storage or shipment of the bonded unit 12' of the container's main body 12 and lifter bar members 30,32 in nested relation with other like units. Specifically, the tapered configuration of the main body 12 of the container 30 readily enables a plurality of the main bodies 12 to be nested by successive insertion of one into the hollow interior of another. The inward deformation of the main body 12 in the areas of bonding to the bonding surfaces 48,60 of the upper and lower lifter bar members 30,32 is importantly less than the degree of the respective undercuts in the main body 12 beneath each lifter bar member 30,32 and, further, the extent to which the lifter portion 52 of the lower lifter bar member 32 extends outwardly from the exterior of the main body 12 is less than the degree of the undercut in the body 12 immediately thereabove, so that the lifter bar members 30,32 do not affect the ability of the main body and lifter bar unit 12' to nest with other like units. Thus, as seen in FIG. 7, when one main body and lifter bar unit 12' is inserted into the hollow interior of another unit 12', the lifter portion 52 of the lower lifter bar member 32 of the inserted unit comes to rest on the undercut 20 of the other unit 12' with the upper lifter bar member 30 of the inserted unit 12' spaced directly above the rim 16 of the other unit 12'. As will be understood, the ability of the main body and lifter bar units 12' for the trash containers 30 enables the units 12' to be shipped and stored compactly in a minimal amount of space to correspondingly reduce shipping and storage costs.

According to the present invention and as more fully explained hereinafter, each container body and lifter bar unit 12' is fabricated basically by initially preforming the upper and lower lifter bar units 30,32 by a plastic blow molding process and, then, forming the main container body 12 by another plastic blow molding process while inserting the preformed lifter bar units 30,32 to bond exteriorly to the main container body 12 during the molding process. The lifter bar members 30,32 and the main container body 12 are preferably formed of the same thermoplastic material, such as a high density polyethylene, to achieve a degree of molecular bonding between the lifter bar members 30,32 and the main container body 12, as hereinafter explained.

Referring now to FIGS. 8–11, the blow molding operation for preforming the upper lifter bar member 30 is schematically illustrated. FIGS. 8 and 9 respectively illustrate schematically in plan view the two mold halves, indicated at 68,70, making up a suitable blow mold apparatus for the fabrication of the upper lifter bar member 30. The mold half 68 includes a mold body 72 having a female mold recess 74 formed in one face 76 thereof in the desired configuration of the upper half of the upper lifter bar member 30 as above-described, while the other mold half 70 similarly includes a mold body 78 having a female mold recess 80 formed in one face 82 thereof in the desired configuration of the lower half of the upper lifter bar 30 as above-described. Particularly, the mold recesses 74,80 of the mold halves 68,70 have corresponding outer convex arcuate surfaces 84,86 which cooperate in the assembled condition of the mold halves 68,70 (FIG. 11) to form the desired arcuate configuration of the bonding surface 48 of the upper lifter bar member 30. Similarly, the mold recesses 74,80 of the mold halves 68,70 also include corresponding inner convex arcuate surfaces 88,90 which cooperate in the assembled relation of the mold halves 68,70 to form the desired arcuate configuration of the ledge surface 46 of the upper lifter bar member 30. The mold half 70 further includes an elongated molding portion 92 generally centrally within the mold recess 80 and projecting outwardly beyond the face 82 of the mold body 78 in the configuration of the desired undercut area 42 of the upper lifter bar member. The respective outer surfaces 94,96 of the mold recesses 74,80 cooperate with the projecting portion 92 to form the desired rounded configuration of the lifter portion 38 of the upper lifter bar member 30. The mold bodies 72,78 further include respective mating air channels formed in the mold faces 76,82 to form an air passageway into the molding cavity formed by the mold recesses 74,80 in the assembled relation of the mold halves 68,70.

Figure 10:
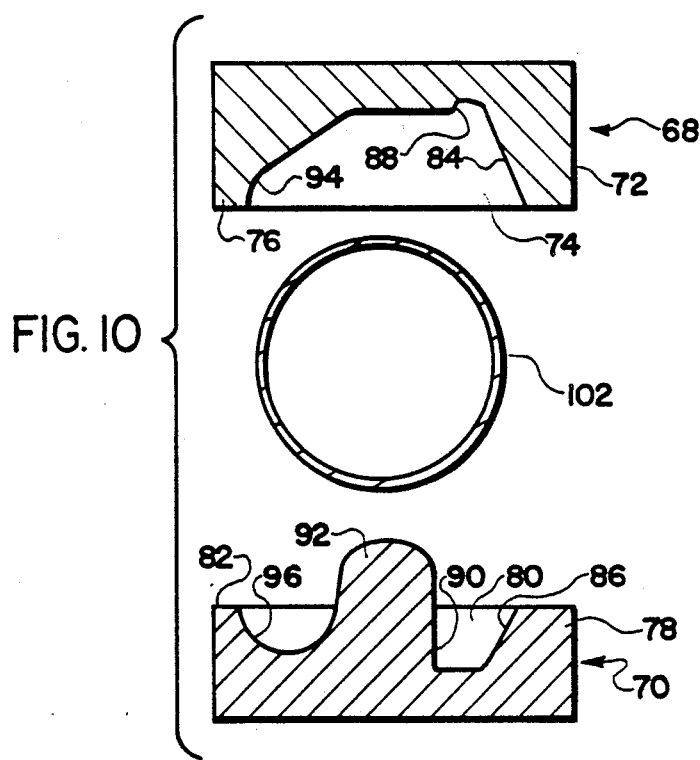
FIG. 10 is an exploded cross-sectional view of the mold halves of FIGS. 8 and 9 taken along lines 10—10 in each thereof, illustrating the mold halves preliminary to the blow molding of a plastic parison in the mold halves to form the upper lifter bar member.
Figure 11:
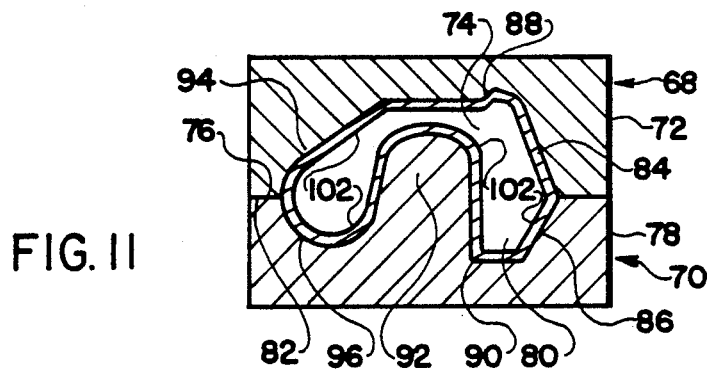
FIG. 11 is another cross-sectional view of the mold halves of FIGS. 8 and 9 also taken along lines 10—10 of each thereof, showing the mold halves in assembled relation at the completion of the blow molding of the plastic parison to form the upper lifter bar member.

As best seen in FIGS. 10 and 11, in preforming the upper lifter bar member 30, the mold halves 68,70 are initially separated with their mold faces 76,82 in spaced facing relation while a compounding plastic extruder (not shown) extrudes a molten hollow plastic tube 102, commonly referred to as a parison, into the area between the mold halves 68,70. The mold halves 68,70 are then brought together into surface abutment of these respective mold faces 76,82 to capture the molten plastic parison 102 within the mold cavity defined by the mold recesses 74,80. Simultaneously, pressurized air is directed through the air passageway formed by the air channels 98,100 into the hollow center of the molten plastic 102 to cause it to expand uniformly into conformance with the configuration of the mold cavity as defined by the mold recesses 74,80, as seen in FIG. 11. As will be understood, the projecting portion 92 of the mold half 70 extends partially into the mold recess 74 of the mold half 68 to partially pinch a central area of the parison 102 to restrict its expansion in such area to form the connecting portion 40 and the undercut area 42 of the upper lifter bar member 30.

Figure 15:
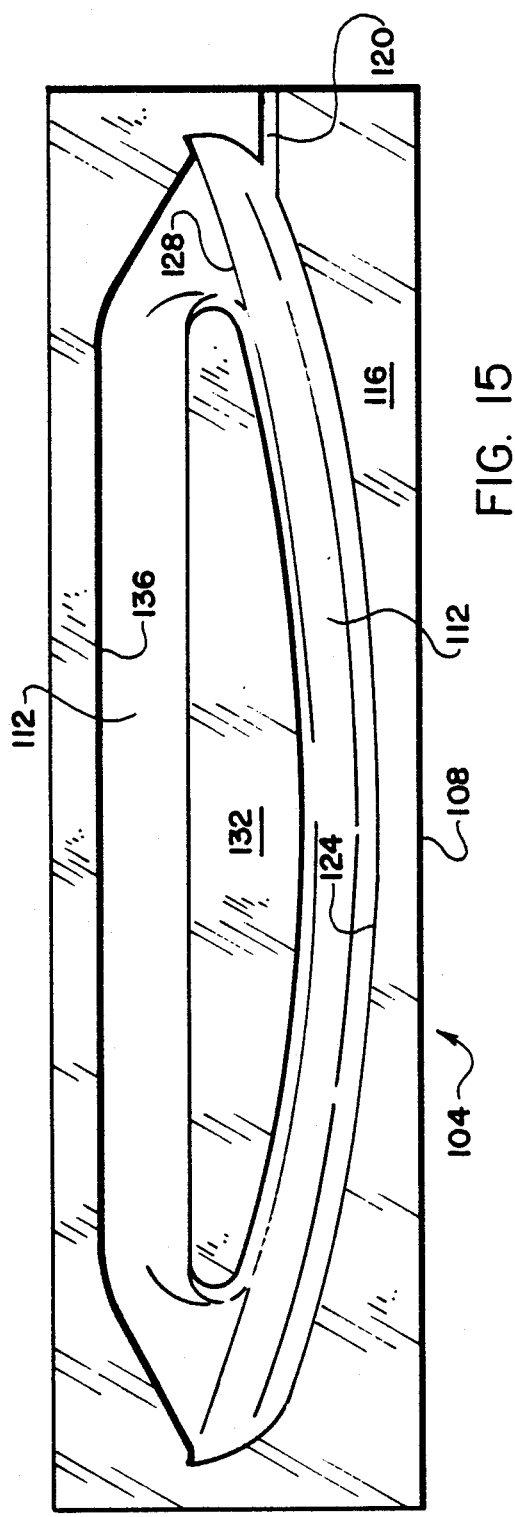
FIGS. 15 is 16 are schematic plan views of the respective mold halves of a blow mold apparatus for blow molding of the lower lifter bar member of the plastic trash container of FIGS. 1 and 2.
Figure 16:
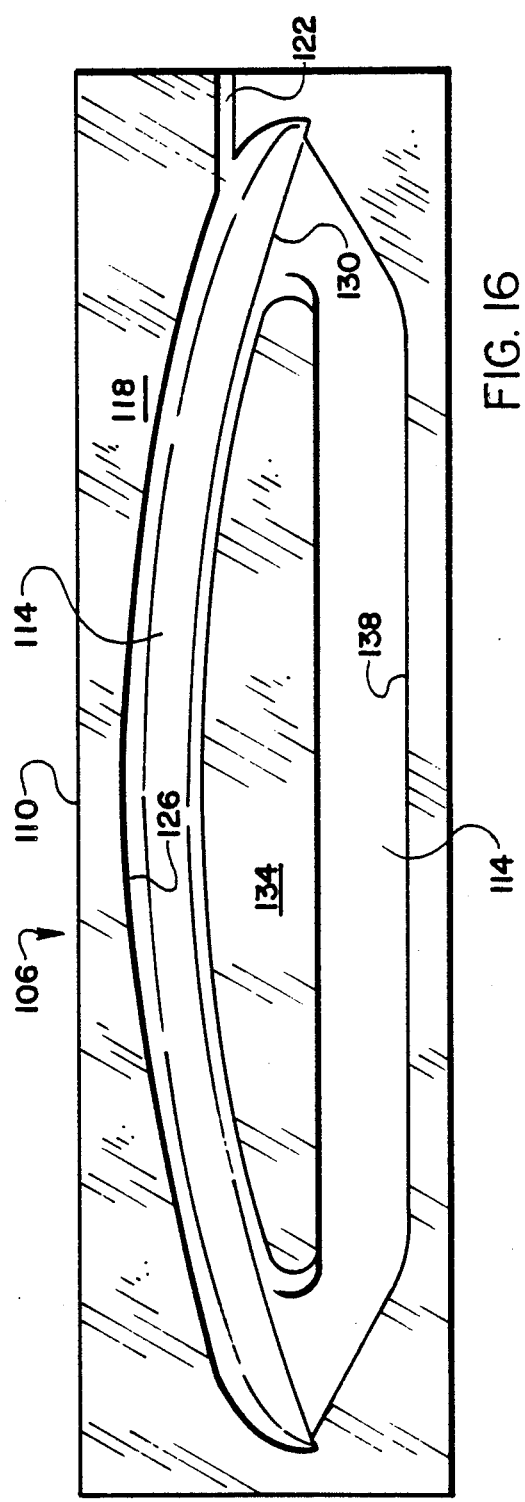
Figure 17:
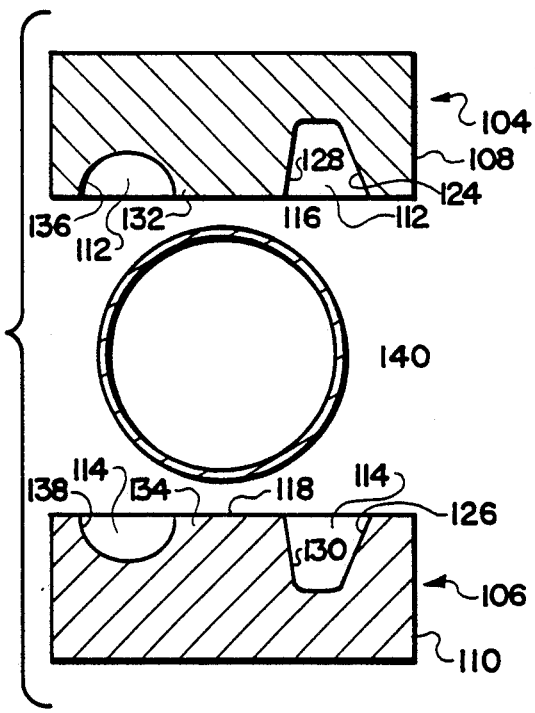
FIG. 17 is an exploded cross-sectional view of the mold halves of FIGS. 15 and 16 taken along lines 17—17 of each thereof, illustrating the mold halves preliminary to the blow-molding of a plastic parison in the mold halves to form the lower lifter bar member.
Figure 18:
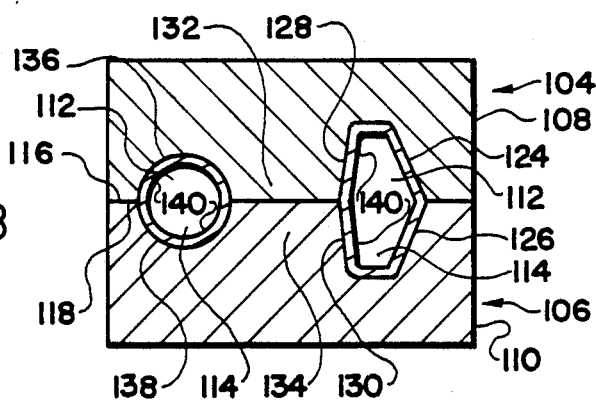
FIG. 18 is another vertical cross-sectional view of the mold halves of FIGS. 15 and 16 also taken along lines 17—17 of each thereof, showing the mold halves in assembled relation at the completion of the blow molding of the plastic parison to form the lower lifter bar member.

The blow molded preforming of the lower lifter bar member 32 will best be understood by similar reference to FIGS. 15–18. In FIGS. 15 and 16, the respective mold halves of a blow mold apparatus for forming the lower lifter bar member 32 are indicated generally at 104,106 which have respective mold bodies 108,110 with substantially identical respective mold recesses 112,114 formed as mirror images of one another in respective mold faces 116,118 of the mold bodies 108,110. The mold faces 116,118 have respective air channels 120,122 formed therein to cooperatively form an air passageway for admitting pressurized air into the mold cavity formed by the mold recesses 112,114 in their assembled relation (FIG. 18). The mold recesses 112,114 of the mold halves 104,106 have respective outer convex arcuate surfaces 124,126 which cooperate in the assembled condition of the mold halves 104,106 to form the desired arcuate configuration of the bonding surface 60 of the lower lifter bar member 32. Similarly, the mold recesses 112,114 have respective inner convex arcuate surfaces 128,130 formed at an inward spacing from the outer arcuate surfaces 124,126 to cooperatively form the desired configuration of the arcuate ledge surface 58 of the lower lifter bar member 32 in the assembled relation of the mold halves 104,106. The mold bodies 108,110 further include respective elongated projection portions 132,134 centrally within the mold recesses 112,114 which are adapted to abut in the assembled relation of the mold halves 104,106 to define the desired clearance area 54 of the lower lifter bar member 32. Outer surfaces 136,138 are respectively formed in the mold recesses 112,114 to define, in cooperation with the projecting portions 132,134, the desired rounded configuration of the lifter portion 52 of the lower lifter bar member 32.

As seen in FIGS. 17 and 18, in the molding operation of the mold halves 104,106, the mold bodies 108,110 are initially separated with their respective mold faces 116,118 in facing mirror image relation to one another while a compounding thermoplastic extruder (not shown) extrudes a tubular parison 140 into the area between the mold faces 116,118. Thereupon, the mold halves 104,106 are brought together into surface abutment of their respective faces 116,118 to capture the molten plastic parison 140 within the mold cavity defined by the mold recesses 112,114. At the same time, a supply of compressed air is directed through the air passageway defined by the facing air channels 120,122 into the center of the parison 140 to expand it outwardly into conformity with the configuration of the mold cavity defined by the recesses 112,114. As will be understood, the projecting portions 132,134 of the mold bodies 108,110 cooperatively pinch a central area of the tubular parison 140 to prevent any corresponding expansion of the pinched portion of the parison 140, thereby to form the clearance area 54.

As previously indicated, the main body 12 of the trash container 10 is also molded by a blow molding procedure, a section of one mold part of the blow mold apparatus for the formation of the main container body 12 being indicated representatively at 142 in FIGS. 22-25. As will be understood, the blow mold apparatus 142 for the main container body 12 is recessed as at 144 forming a mold cavity in the desired above-described configuration of the main container body 12. The blow mold apparatus 142 for the container body 12 is further formed with recessed insert areas 146,148 formed in the mold surface 144 to open into the mold cavity for supporting the preformed upper and lower lifter bar members 30,32, respectively, during the process of blow molding the main container body 12. Specifically, the mold surface 144 of the blow mold apparatus 142 includes a continuous insert land area 150 facing inwardly of the mold cavity annularly about the upper recessed insert area 146 to define the outward edge of the insert area 146 opening into the mold cavity. The insert land surface 150 is dimensioned and configured in substantial conformity to the annular ledge surface 46 of the upper lifter bar member 30 and, particularly, the insert land surface 150 is of a substantially uniform end-to-end arcuate curvature which is convex with respect to the molding cavity, as indicated at 150' in FIG. 24, in correspondence to the described curvature of the ledge surface 46 of the upper lifter bar member 30. The interior surfaces 152 defining the recessed insert area 146 are similarly dimensioned and configured in correspondence with the lifter and connecting portions 38,40 of the upper lifter bar member 30. Thus, the recessed insert area 146 is adapted to receive and retain the lifter and connecting portions 38,40 of the upper lifter bar member 30 with its ledge surface 46 outwardly of the insert area 146 in at least generally facing abutment with the insert land surface 150 to expose the bonding surface 48 of the upper lifter bar member 30 facing and protruding inwardly into the molding cavity of the blow mold apparatus 142.

Similarly, the lower recessed insert area 148 is defined by a continuous insert land surface 154 of the mold surface 144 which faces inwardly of the molding cavity annularly about the insert area 148. The insert land surface 154 is dimensioned and configured in substantial conformity to the ledge surface 58 of the lower lifter bar member 32, including being of a substantially uniform convex end-to-end arcuate curvature convex with respect to the molding cavity, as indicated at 154' in FIG. 25, in correspondence to the described curvature of the ledge surface 58 of the lower lifter bar member 32. The interior surfaces 156 defining the recessed insert area 148 are similarly dimensioned and configured in correspondence with the lifter portion 52 of the lower lifter bar member 42. In this manner, the recessed insert area 148 is adapted to receive and retain the lifter portion 52 of the lower lifter bar member 32 with its ledge surface 58 outwardly of the insert area 148 in generally facing abutment with the insert land surface 154 to expose the bonding surface 60 of the lower lifter bar member 32 facing and protruding inwardly into the molding cavity of the blow mold apparatus 142.

In the formation of the main container body 12, the mold parts of the blow mold apparatus 142 are initially separated in facing relation with one another and the preformed upper and lower lifter bar members 30,32 are preliminarily inserted into the recessed insert areas 146,148 as above-described. Thereafter, a compounding thermoplastic extruder (not shown) extrudes a tubular parison 158 of molten thermoplastic material into the area between the mold parts, following which the mold parts are brought together into abutment to capture the parison 158 in the mold cavity and simultaneously pressurized air is directed into the hollow interior of the parison 158 to cause it to expand into conformity with the mold surfaces, such as surface 144, and into conformity with the exposed bonding surfaces 48,60 by which the parison 158 bonds integrally in substantially continuous surface contact with the bonding surfaces 48,60, thereby forming the main container body and lifter bar unit 12'.

A number of distinct and important advantages are realized by the above-described process of fabricating the main container body and lifter bar unit 12'. First, since the lifter bar members 30,32 and the main body 12 are formed of the same thermoplastic material, preferably high density polyethylene, the bonding which takes place in the blow molding of the main body 12 produces a degree of molecular bonding between the bonding surfaces 48,60 and the main container body 12. Specifically, as the molten parison 158 expands into contact with the bonding surfaces 48,60 of the lifter bar members 30,32, the hot plastic material of the parison 158 partially heats the bonding surfaces 48,60 to achieve a degree of intermingling of the molecular chains making up the plastic material of the bonding surfaces 48,60 and the parison 158, resulting in a significant strengthening of the bond therebetween. Inasmuch as both the lifter bar members 30,32 and the main container body 12 are fabricated by blow molding techniques, the individual molded components further realize the above-described advantages of superior stress crack resistance and impact strength over other conventional techniques of plastic formation. Any undesired thinness in the wall thickness of the bonding surfaces 48,60 of the lifter bar members 30,32 which may occur in the blow molded fabrication thereof is strengthened and overcome by the molecular bonding of the main body parison 158 to the bonding surfaces 48,60. The convexity of the bonding surfaces 48,60 of the lifter bar members 30,32, both end-to-end and top-to-bottom thereof, increases the overall area of bonding between the main body 12 and the lifter bar members 30,32 and produces a degree of wrapping of the main body 12 about the bonding surfaces 48,60 to produce the afore-described inward deformation of the main body 12, all of which additionally serves to provide added strength to the bond between the lifter bar members 30,32 and the main container body 12. In this same regard, the smoothness of the curvature of the bonding surfaces 48,60 directs and aids the expanding parison 156 during the blow molding of the main container body 12 to expand uniformly along and about the bonding surfaces 48,60 to produce a generally consistent wall thickness of the container body 12 throughout the areas of bonding to the bonding surfaces 48,60.

Also, the corresponding arcuate end-to-end curvature of the respective ledge surfaces 46,58 of the lifter bar members 30,32 serves to substantially prevent so-called "blow-outs" of the parison 158 which are known to occur in other preform insertion procedures in blow molding operations where the expanding parison enters a recessed insert area and undesirably expands to the point of bursting the parison at the point of entry. Ordinarily, to avoid such "blow-out" problems, close dimensional tolerances are required between the inserted preform and the receiving recess in a blow mold apparatus, which may be difficult if not impossible where the inserted preform is of other than a linear configuration at the point of inserted contact with the blow mold apparatus. The arcuate nature of the respective ledge and land surfaces 46,150 and 58,154 of the lifter bar members 30,32 and the blow mold apparatus 142 avoid this problem without requiring close tolerances or close conformity between the arcuate configurations of the ledge and land surfaces. Specifically, the arcuate land surfaces 150,154 of the blow mold apparatus 142 act in the nature of cam surfaces where the arcuate ledge surfaces 46,58 of the lifter bar members 30,32 do not precisely conform in curvature to urge the ledge surfaces 46,58 to deform slightly under the effect of the pressurized blow molding air to conform the ledge surfaces 46,58 in essentially sealing abutment respectively to the land surfaces 150,154 thereby to close off any possible gaps or other pathways through which the expanding main body parison 158 could enter the recessed insert areas 146,148. This advantage is of particular importance in enabling the above-described fabrication process to be implemented economically on a commercial scale. Finally, the present fabrication process of bonding the insert bar members 30,32 to the main body 12 as part of the blow molding thereof provides the further advantage of eliminating the conventional need to bolt or otherwise manually affix appropriate metal or other lifter bar members to the finished container body 12.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. Molding apparatus for fabricating a plastic container having an integral lifting member, said apparatus comprising:
    a blow mold apparatus having a molding cavity for forming a main body of said plastic container, a recessed insert area opening into said molding cavity, and an insert land surface facing inwardly of said molding cavity continuously about said recessed area, said insert land surface being of a generally smooth end-to-end curvature convexly with respect to said molding cavity; and
    a preformed plastic lifter bar member having a continuous ledge surface of a generally smooth end-to-end curvature at least generally conforming with said insert land surface and having a continuous bonding surface defined by and facing oppositely from said ledge surface and being of a generally smooth end-to-end curvature generally corresponding to said ledge surface;
    said preformed lifter bar member inserted in said recessed insert area of said blow mold apparatus with said ledge surface at least generally in facing abutment with said insert land surface and with said bonding surface protruding inwardly into said molding cavity;
    said curved ledge surface being effective for conforming in essentially sealing abutted relation to said land surface under the pressure of blow molding a plastic parison into said molding cavity to prevent said parison from entering said recessed area and said curved bonding surface being effective for urging said parison to expand uniformly thereabout for bonding of a generally consistent wall thickness of said parison to said bonding surface.

2. Molding apparatus for fabricating a plastic container according to claim 1 wherein said lifter bar member is blow molded from a plastic lifter bar parison.

3. Molding apparatus for fabricating a plastic container according to claim 2 wherein said lifter bar parison includes a pinched area forming an undercut on said lifter bar member at the outward side thereof opposite said bonding surface.

4. Molding apparatus for fabricating a plastic container according to claim 2 wherein said lifter bar parison includes a pinched central area forming a bonding portion having said ledge and bonding surfaces and a lifting engagement portion spaced by an open clearance area from said bonding portion.

5. Molding apparatus for fabricating a plastic container according to claim 1 wherein said molding cavity is of a configuration to permit nesting of said container with other like containers.

6. Molding apparatus for fabricating a plastic container according to claim 1 wherein said insert land surface is of a generally uniform arcuate curvature and said ledge surface is of a generally uniform arcuate curvature.

7. Molding apparatus for fabricating a plastic container according to claim 6 wherein said bonding surface is of a generally uniform arcuate curvature essentially concentric with said ledge surface.

8. Molding apparatus for fabricating a plastic trash container for mechanized emptying by an automated dumping apparatus, said molding apparatus comprising:
    a blow mold apparatus having a molding cavity for forming a main body of said plastic trash container, spaced upper and lower recessed insert areas opening into said molding cavity, and a respective annular insert land surface facing inwardly of said molding cavity continuously about each said recessed insert area, each said insert land surface being of a generally uniform end-to-end curvature convexly with respect to said molding cavity; and
    preformed blow-molded upper and lower lifter bar members configured for engagement by said automated dumping apparatus, each said lifter bar member including a lifter bar body having a continuous annular ledge surface of a generally uniform end-to-end curvature at least generally conforming with the insert land surface of the respective said recessed insert area and having a continuous bonding surface defined by and facing oppositely from said ledge surface and being of a generally uniform end-to-end curvature generally corresponding to said ledge surface;

said preformed upper and lower, lifter bar members inserted respectively in said upper and lower recessed insert areas of said blow mold apparatus with said ledge surface of each said lifter bar member at least generally in facing abutment with the respective said insert land surface and with said bonding surface of each said lifter bar member protruding inwardly into said molding cavity;

said curved ledge surfaces of said lifter bar members being effective for conforming in essentially sealing abutted relation respectively to said land surfaces of said blow mold apparatus under the pressure of blow molding a plastic container parison into said molding cavity to prevent said container parison from entering said recessed areas and said curved bonding surfaces of said lifter bar members being effective for urging said container parison to expand uniformly thereabout for bonding of a generally consistent wall thickness of said container parison to said bonding surfaces.

9. Molding apparatus for fabricating a plastic trash container according to claim 8 wherein said upper lifter bar member includes a pinched area forming an undercut on said upper lifter bar member at the outward side thereof opposite said bonding surface.

10. Molding apparatus for fabricating a plastic container according to claim 8 wherein said lower lifter bar member includes a pinched central area forming a bonding portion having said ledge and bonding surfaces and a lifting engagement portion spaced by an open clearance area from said bonding portion.

11. Molding apparatus for fabricating a plastic container according to claim 8 wherein said molding cavity is of a configuration to permit nesting of said container with other like containers.

12. Molding apparatus for fabricating a plastic container according to claim 8 wherein each said insert land surface is of a generally uniform arcuate curvature and each said ledge surface is of a generally uniform arcuate curvature.

13. Molding apparatus for fabricating a plastic container according to claim 12 wherein each said bonding surface is of a generally uniform arcuate curvature essentially concentric with its said ledge surface.

14. Molding apparatus for fabricating a plastic container according to claim 13 wherein said molding cavity is of a configuration to permit nesting of said container with other like containers.

15. Molding apparatus for fabricating a plastic container according to claim 14 wherein said upper lifter bar member includes a pinched area forming an undercut on said upper lifter bar member at the outward side thereof opposite said bonding surface, and said lower lifter bar member includes a pinched central area forming a bonding portion having said ledge and bonding surfaces and a lifting engagement portion spaced by an open clearance area from said bonding portion.

* * * * *